(12) United States Patent
Howell et al.

(10) Patent No.: US 7,694,555 B2
(45) Date of Patent: Apr. 13, 2010

(54) BRAKE PAD PROGNOSIS SYSTEM

(75) Inventors: Mark N. Howell, Rochester Hills, MI (US); John P. Whaite, Jr., Davison, MI (US); Phanu Amatyakul, Brighton, MI (US); Yuen-Kwok Chin, Troy, MI (US); Mutasim A. Salman, Rochester Hills, MI (US); Chih-Hung Yen, West Bloomfield, MI (US); Mark T. Riefe, Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 163 days.

(21) Appl. No.: 12/036,675

(22) Filed: Feb. 25, 2008

(65) Prior Publication Data

US 2008/0236269 A1  Oct. 2, 2008

Related U.S. Application Data

(60) Provisional application No. 60/908,357, filed on Mar. 27, 2007.

(51) Int. Cl.
G01M 17/00 (2006.01)
(52) U.S. Cl. ....................................................... 73/129
(58) Field of Classification Search .................... 73/121, 73/128, 129, 130
See application file for complete search history.

(56) References Cited

U.S. PATENT DOCUMENTS

| 5,372,221 A | * | 12/1994 | Jalbert ..................... 188/1.11 L |
| 6,680,672 B2 | * | 1/2004 | Borugian ..................... 340/584 |
| 7,165,657 B2 | * | 1/2007 | Palladino ................ 188/1.11 L |
| 2005/0212357 A1 | | 9/2005 | Adams |

FOREIGN PATENT DOCUMENTS

DE  101 21 429 A 1  1/2002

* cited by examiner

Primary Examiner—Eric S McCall
(74) Attorney, Agent, or Firm—John A. Miller; Miller IP Group, PLC

(57) ABSTRACT

A method for providing an estimate of brake pad thickness. The method employs fusion of sensors, if used, and driver brake modeling to predict the vehicle brake pad life. An algorithm is employed that uses various inputs, such as brake pad friction material properties, brake pad cooling rate, brake temperature, vehicle mass, road grade, weight distribution, brake pressure, brake energy, braking power, etc. to provide the estimation. The method calculates brake work using total work minus losses, such as aerodynamic drag resistance, engine braking and/or braking power as braking torque times velocity divided by rolling resistance to determine the brake rotor and lining temperature. The method then uses the brake temperature to determine the brake pad wear, where the wear is accumulated for each braking event. A brake pad sensor can be included to provide one or more indications of brake pad thickness from which the estimation can be revised.

20 Claims, 4 Drawing Sheets

BRAKE PAD PROGNOSIS SYSTEM

CROSS-REFERENCE TO RELATED APPLICATIONS

This application claims priority to U.S. Provisional Patent Application Ser. No. 60/908,357, filed Mar. 27, 2007, titled "Brake Pad Prognosis System."

BACKGROUND OF THE INVENTION

1. Field of the Invention

This invention relates generally to a system and method for estimating the thickness of a vehicle brake pad as it wears from use and, more particularly, to a system and method that uses sensor fusion and brake modeling for estimating the thickness of a vehicle brake pad as it wears from use.

2. Discussion of the Related Art

Vehicle brake pads typically last between 20,000 and 80,000 miles depending on the type of driving, i.e., city, highway, rural, etc., where the average brake pad life is about 50,000 miles. The thickness of the brake pad gradually decreases as a result of wear as it is used. When the thickness of the brake pad becomes sufficiently small, a mechanical scraper makes contact with the brake rotor. The mechanical scraper makes an annoying high frequency noise, which is an unfriendly reminder that the brake pad needs to be replaced. Although the noise does alert the vehicle operator that the brake pad is worn out, it does not give the vehicle operator advanced warning, or a continuous determination the lining thickness, only that the brake pad has worn down to a low level. Therefore, for example, if a long trip is planned, there is no indication that the brake pads may not last the journey.

It is known in the art to provide a sensor that determines brake pad thickness as it wears. For example, sensors are known that include one or more wires extending across the brake pad at certain thickness levels so that when the wire breaks, the sensor will provide an indication that the brake pad thickness has been reduced a certain amount. However, such sensors are typically expensive, and do not provide a continuous indication of brake pad thickness through the life of the brake pad.

SUMMARY OF THE INVENTION

In accordance with the teachings of the present invention, a system and method are disclosed for providing an estimate of brake pad thickness as the brake pad wears during operation of a vehicle. The method employs fusion of sensors, if used, and driver brake modeling to predict the vehicle brake pad life. An algorithm is employed that uses various inputs, such as brake pad friction material properties, brake pad cooling rate, brake pad temperature, vehicle mass, road grade, weight distribution, brake pressure, brake energy, braking power, etc. to provide the estimation. The system and method calculate brake work using total work minus losses, such as aerodynamic drag resistance, engine braking and/or braking power as braking torque times velocity divided by rolling resistance to determine the brake rotor and lining temperature. The system and method then use the brake temperature to determine the brake pad wear, where the wear is accumulated for each braking event. A brake pad sensor can be included to provide one or more indications of brake pad thickness from which the estimation can be revised.

Additional features of the present invention will become apparent from the following description and appended claims taken in conjunction with the accompanying drawings.

DETAILED DESCRIPTION OF THE EMBODIMENTS

The following discussion of the embodiments of the invention directed to a system and method for continuously estimating brake pad thickness using sensor fusion and brake modeling is merely exemplary in nature, and is in no way intended to limit the invention or its applications or uses.

The present invention proposes using sensor fusion, driver braking information and driver brake models to predict or estimate vehicle brake pad thickness, and provide an indication of remaining brake pad life, such as in remaining miles or percentage of brake pad thickness, to the vehicle operator. The brake pad thickness estimation process of the invention can be used in combination with a brake pad sensor to determine whether the brake pad thickness estimation is accurate. Particularly, as the brake pad wears, sensor wires may be broken that provide an indication of the remaining brake pad thickness, which can be compared to the estimation to improve the estimation calculations. As will be discussed in detail below, the brake pad thickness estimation algorithm of the invention uses various parameters and sensor signals to provide the estimation, including, but not limited to, brake pad friction material properties, brake pad cooling rate, brake temperature, vehicle mass, road grade, dynamic brake proportioning, vehicle weight distribution, brake pressure applied, braking energy, braking power, etc.

Figure 1:
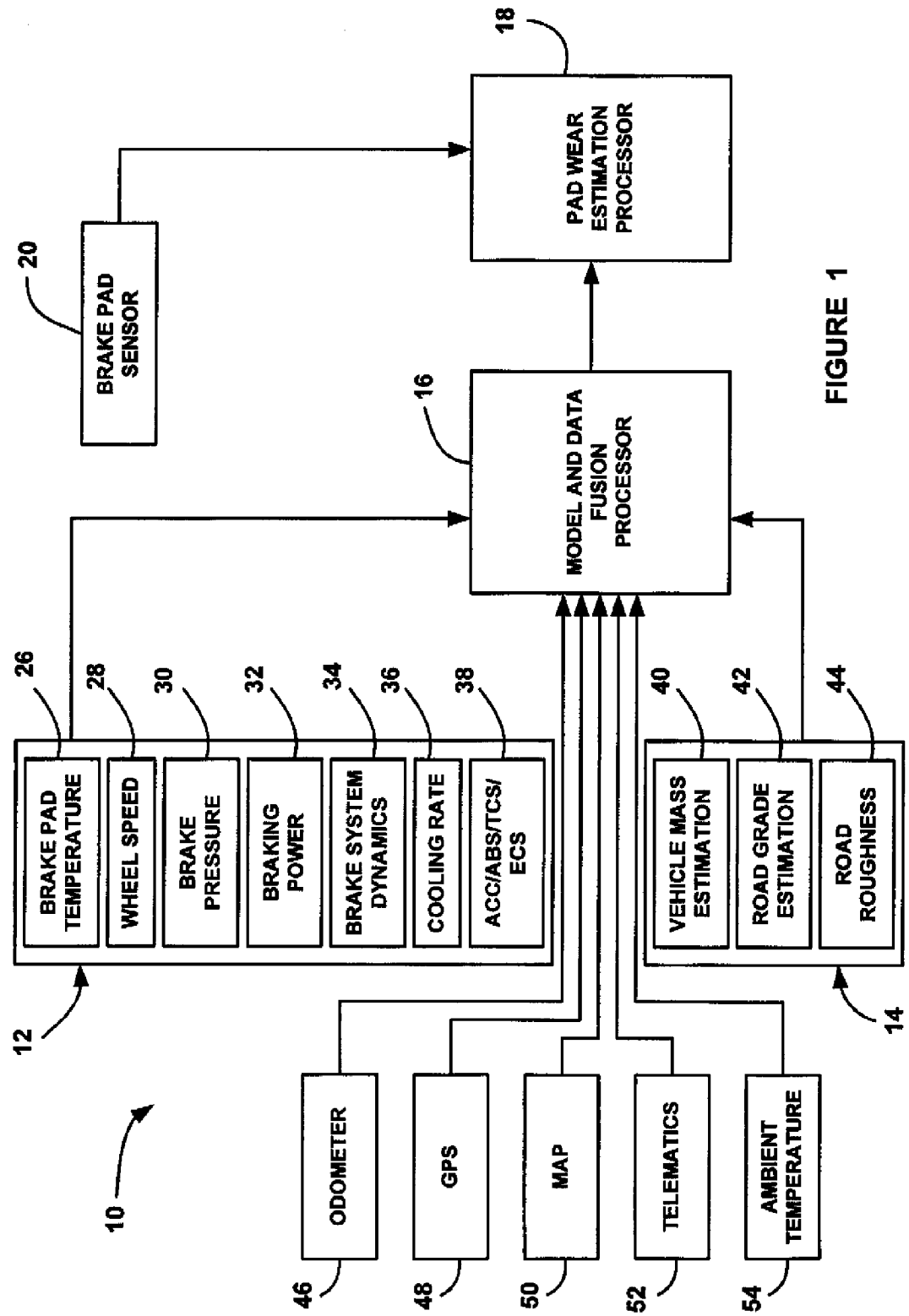
FIG. 1 is a block diagram of a system for estimating brake pad thickness, according to an embodiment of the present invention.

FIG. 1 is a block diagram of a brake pad thickness estimation system 10 that estimates brake pad thickness, according to an embodiment of the present invention. The system 10 includes a brake controller 12 and a power train controller 14. Further, the system 10 includes a model and data fusion processor 16 and a brake pad wear estimation processor 18. The system 10 may also include a brake pad sensor 20 of any suitable type, including those known in the art, that provides a brake pad thickness indication signal generally when a wire in the brake pad is broken as a result of brake pad wear.

The brake controller 12 includes a brake pad temperature estimation processor 26, wheel speed sensors 28, a brake pressure processor 30 and a brake power calculation processor 32. Additionally, the brake controller 12 includes a processor 34 providing brake system dynamics, a processor 36 providing brake cooling rate and a processor 38 that provides signals from an anti-lock brake system (ABS), traction control system (TCS), electronic control system (ECS) and an ACC. All or most of the calculations done in the processors 26-38 are currently available on vehicles and/or are well known to those skilled in the art.

The power train controller 14 includes a vehicle mass estimation processor 40, a road grade estimation processor 42 and a road roughness estimation processor 44. Additional signals may be available for estimating the brake pad thickness, such as vehicle odometer 46, GPS signals 48, map information 50, vehicle telematics 52 and an ambient temperature sensor 54. All of the signals provided by these processors and devices are also typically available on a vehicle, and would be readily available to those skilled in the art.

The brake pad temperature estimation processor 26 estimates the temperature of the brake pads. Depending on the brake pad material, the brake pad wear will depend on the temperature of the brake pad. The cooling rate of the brake pad when they are not in use helps determine the brake pad temperature, and is dependent on the vehicle design, vehicle speed, wheel speed, ambient temperature, altitude, etc. As the vehicle moves, the air flowing around the brake pad will determine how fast it is cooled from the previous braking event. The brake pad temperature can also be measured with sensors. However, such sensors are expensive, and thus, an algorithm estimating the brake pad temperature is typically more desirable.

The braking power processor 30 estimates the braking energy dissipation in the brakes. This calculation uses various inputs, such as stopping distance, stopping time, brake pad temperature, etc. The brake pressure processor 30 can use the master cylinder pressure of the braking system, the weight distribution in the vehicle and the dynamic brake proportioning for the proportional brake pressure at each wheel to determine the brake pressure. The dynamic brake proportioning is based on where the weight in the vehicle is distributed, and is a known calculation.

The vehicle mass estimation processor 40 estimates the vehicle mass, typically based on engine torque, and is a process well known to those skilled in the art. The mass of the vehicle may change as a result of the number of passengers, load in the trunk, fuel capacity, etc. Further, it is known in the art estimate the road grade in the estimation processor 42 in combination with the estimation of the vehicle mass.

The processor 16 can calculate the braking energy by equation (1) below. The braking energy is the work done by the brakes to decelerate the vehicle, and is the total work minus the rolling resistance, the aerodynamic drag, the engine braking and the road grade. The brake work can be used to calculate the power dissipated by the brakes, where power equals work/time. The power can be calculated at predetermined time intervals, for example, every 10 ms, during the braking event.

$$BrakingEnergy = \frac{1}{2}M(V_I^2 - V_F^2) - E_{Rolling\ Resistance} - E_{Grade} - E_{Engine} \quad (1)$$

In equation (1), M is the mass of the vehicle, $E_{Rolling\ Resistance}$ is the energy required to roll the vehicle on a flat grade, which is a known value, $E_{Grade}$ is the energy required to roll the vehicle as a result of the grade of the road, which is also a known value, $E_{Engine}$ is the braking provided by the engine itself, and is also a known value, $V_I$ is the velocity of the vehicle at the beginning of the braking event and $V_F$ is the velocity of the vehicle at the end of the braking event. In an alternate embodiment, vehicle deceleration can be used instead of the vehicle speed V, and can be provided by a longitudinal acceleration sensor.

The braking power dissipated by the braking event can also be estimated as power=force·velocity. Braking force can be calculated as:

$$BrakingForce = pressure \cdot area \cdot \mu \quad (2)$$

Where μ is the friction coefficient of the brake pad, which is a function of the pad temperature, and area is the surface area of the brake pad.

Alternately, the braking power can be calculated as:

$$BrakingPower = \frac{Torque}{RollingRadius} \cdot Velocity \quad (3)$$

The torque is calculated for both the front and the rear of the vehicle and is a function of the brake pressure and the dynamic brake proportioning. The RollingRadius is the rolling radius of the wheel and velocity is the vehicle velocity.

The integration of the applied braking force can be input into a physical thermal model for first order dynamics to determine an estimate of the brake temperature. Brake pad dynamometer tests can be used to obtain the brake pad friction coefficient as a function of temperature. They can also be used to determine the amount of wear expected at each pad temperature.

The force required to stop the vehicle can be estimated as:

$$Force = mass \cdot acceleration \quad (4)$$

The front/rear brake proportioning information and the cornering information available from the brake controller 12 can be used to determine the power distribution on each axis and corner. The vehicle mass estimation is available from the power train controller 14, and is also used in these equations. From the braking energy or the braking power, the brake pad temperature can be determined as a proportional value, and from the brake pad temperature, the brake pad wear can be determined as a proportional value, typically from a look-up table in the estimation processor 18. Those skilled in the art would readily understand how to provide a look-up table that was populated based on the relationship between the braking energy and the brake pad temperature and the brake pad temperature and the brake pad wear based on the calculations discussed above and the properties of the brake pad. Each time the algorithm calculates the wear of the brake pad, it is added to the previous calculations of wear over time, and can then be extrapolated from the vehicle mileage to determine the remaining mileage for each brake pad.

The pad wear estimation processor 18 will use a combination of the above available information to estimate the thickness of the brake pad. The proportioning of the information can be calibrated for different applications and different vehicles. An estimate of the amount of material of the brake pad lost together with the mileage that the vehicle has been driven since the pads were last changed are recorded on the vehicle. The current estimation can be stored in separate modules on the vehicle. This is used to store the information should a fault occur on one of the modules causing it to be replaced. An estimate of the remaining vehicle mileage can be obtained in a number of ways, such as from driver braking characteristics, linear interpolation or look-up tables of the mileage and the brake pad thickness estimation.

If the system 10 includes the brake pad sensor 20, the signals indicative of actual brake pad thickness from the sensor 20 can be used to gradually ramp out any differences between the estimation of the brake pad thickness and the actual thickness over the remaining pad thickness and life. The sensor 20 can be set so that one or more wires will break at a specific pad thickness. If a significant difference exists between the estimate and the actual thickness, as determined when the sensor brakes contact, then this will be used to gradually adjust the estimate so that when the pad is near the replacement period, or the next sensor measurement, the total system accuracy will be as high as possible. This will involve increasing or decreasing the estimate of the pad life remaining at a rate different from that observed so that the end of the life of the pad will be accurately determined.

Although the brake sensor discussed above employs wires that break to give an indication of pad thickness, other types of brake sensors can be used within the scope of the present invention. For example, an indirect sensor or sensing mechanism can be used to infer the brake pad thickness. Suitable examples include brake fluid level sensors or measuring the displacement of the brake calipers, such as in an electromechanical or brake-by-wire system.

Figure 2:
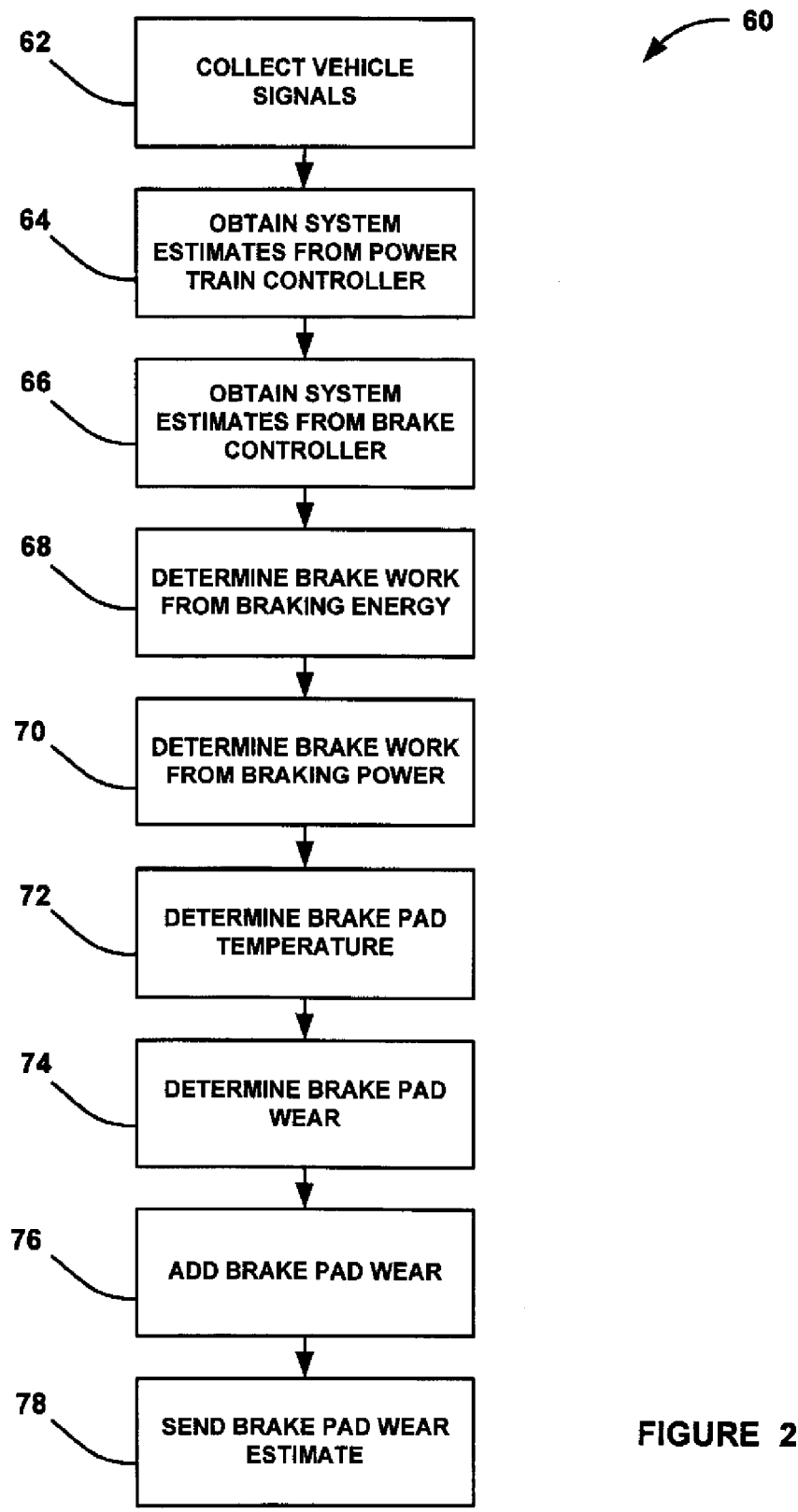
FIG. 2 is a flow chart diagram showing a process for determining brake pad thickness, according to an embodiment of the present invention.

FIG. 2 is a flow chart diagram 60 showing the operation of the algorithm for estimating brake pad thickness, as discussed above. At box 62, the algorithm collects various vehicle signals, such as brake pressure, wheel speeds, vehicle speed, longitudinal acceleration, dynamic brake proportioning, brake being applied, etc. At box 64, the algorithm obtains system estimates from the power train controller 14, such as the vehicle mass, road grade, amount of engine braking, rolling resistance, etc. At box 66, the algorithm obtains system estimates from the brake controller 12, such as the brake temperature.

The algorithm then calculates the brake work from braking energy at box 68 using, for example, equation (1). The brake energy can be calculated for any one of the several brake pads on the vehicle or can be one calculation per vehicle axle.

Additionally, or alternately, the algorithm can determine the brake work using braking power from, for example, equations (2) and (3), at box 70. In this calculation, the brake work is determined by braking power and pressure, such as provided by equation (2). Errors can sometimes occur when determining the mass of the vehicle for the brake energy calculation and the friction coefficient value $\mu$ can include errors in the brake power estimation. Therefore, a more accurate determination of the brake work may be provided by combining the two work calculations.

The algorithm then determines the brake pad temperature at box 72 and the brake pad wear at box 74 in the manner discussed above. The brake pad wear is determined for each braking event, and is added to the accumulated value at box 76 to determine the remaining brake pad thickness. The algorithm can send this information to the vehicle operator using, for example, vehicle telematics at box 78.

Figure 3:
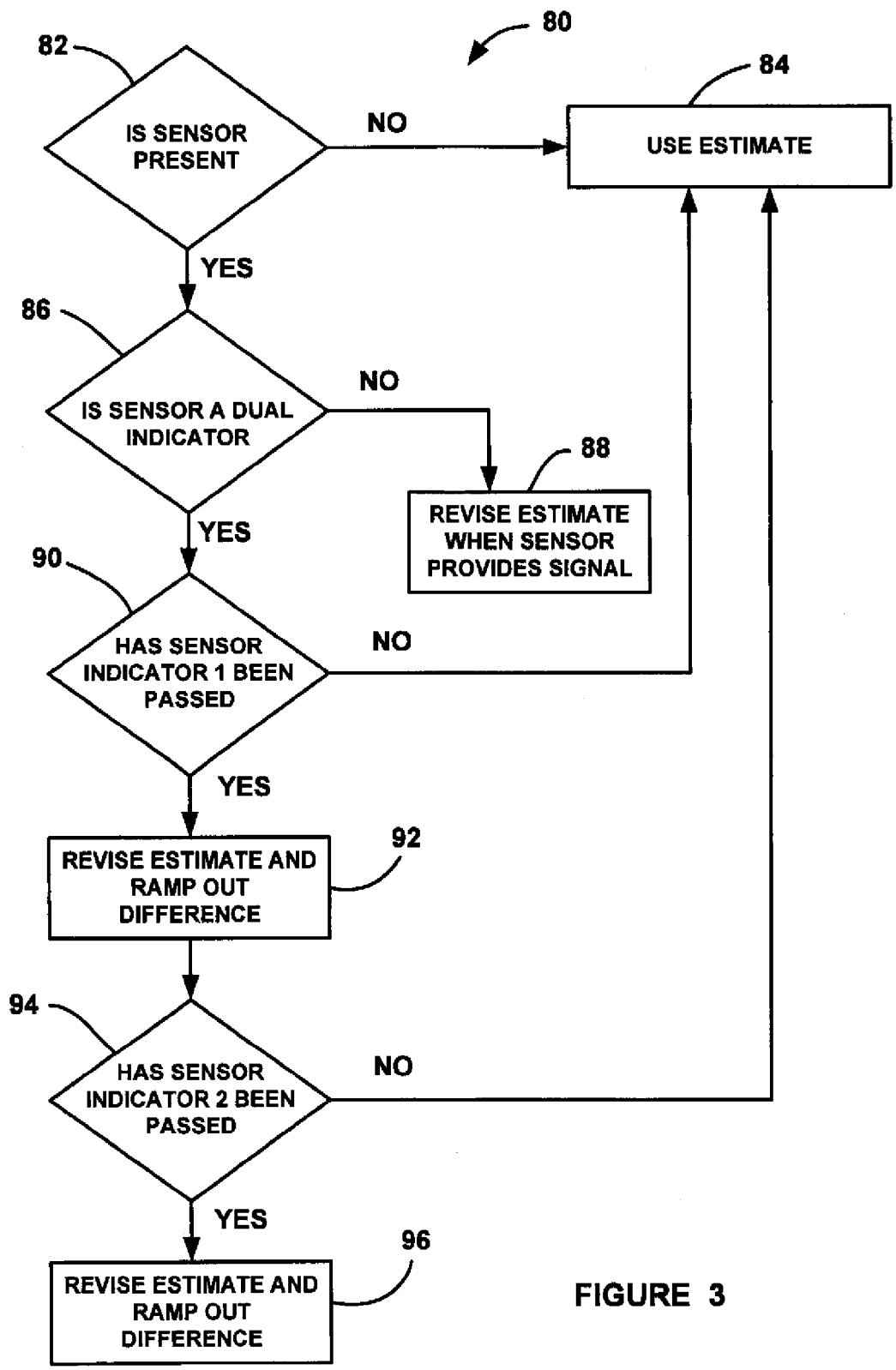
FIG. 3 is a flow chart diagram showing a process for determining if a sensor has provided a signal indicating brake pad thickness, according to an embodiment of the present invention.

FIG. 3 is a flow chart diagram 80 showing a process for combining brake pad sensor information with the brake pad estimation wear determination, according to one embodiment of the present invention. The algorithm determines whether a brake pad sensor is present at decision diamond 82, and if a brake pad sensor is not present, uses only the brake pad thickness estimation to provide the brake pad thickness calculation at box 84. If a brake pad sensor is present at the decision diamond 82, then the algorithm determines whether the brake pad sensor provides more than one indication of the thickness of the brake pad, i.e., whether more than one wire will be broken to indicate brake pad thickness at decision diamond 86. If the brake pad sensor only provides a single indication of brake pad thickness at the decision diamond 86, then the algorithm revises the estimation when the sensor wire is broken at box 88.

If the brake pad sensor includes more than one wire indicator at the decision diamond 86, the algorithm determines whether the first wire has been broken at decision diamond 90. If the first wire has not been broken at the decision diamond 90, then the algorithm uses the estimation only to determine the brake pad thickness at the box 84. If the first wire has been broken at the decision diamond 90, then the algorithm revises the estimate using the now known brake pad thickness from the sensor at box 92, and ramps out the difference between the estimation and the remaining brake pad thickness over a certain distance. The algorithm then determines whether a second wire has been broken at decision diamond 94, and if not, uses the revised brake pad estimation at the box 84. If the second wire has been broken at the decision diamond 94, then the algorithm updates the estimate at the box 96 in the same manner as the box 94, and ramps out the difference for the remaining brake pad life.

Figure 4:
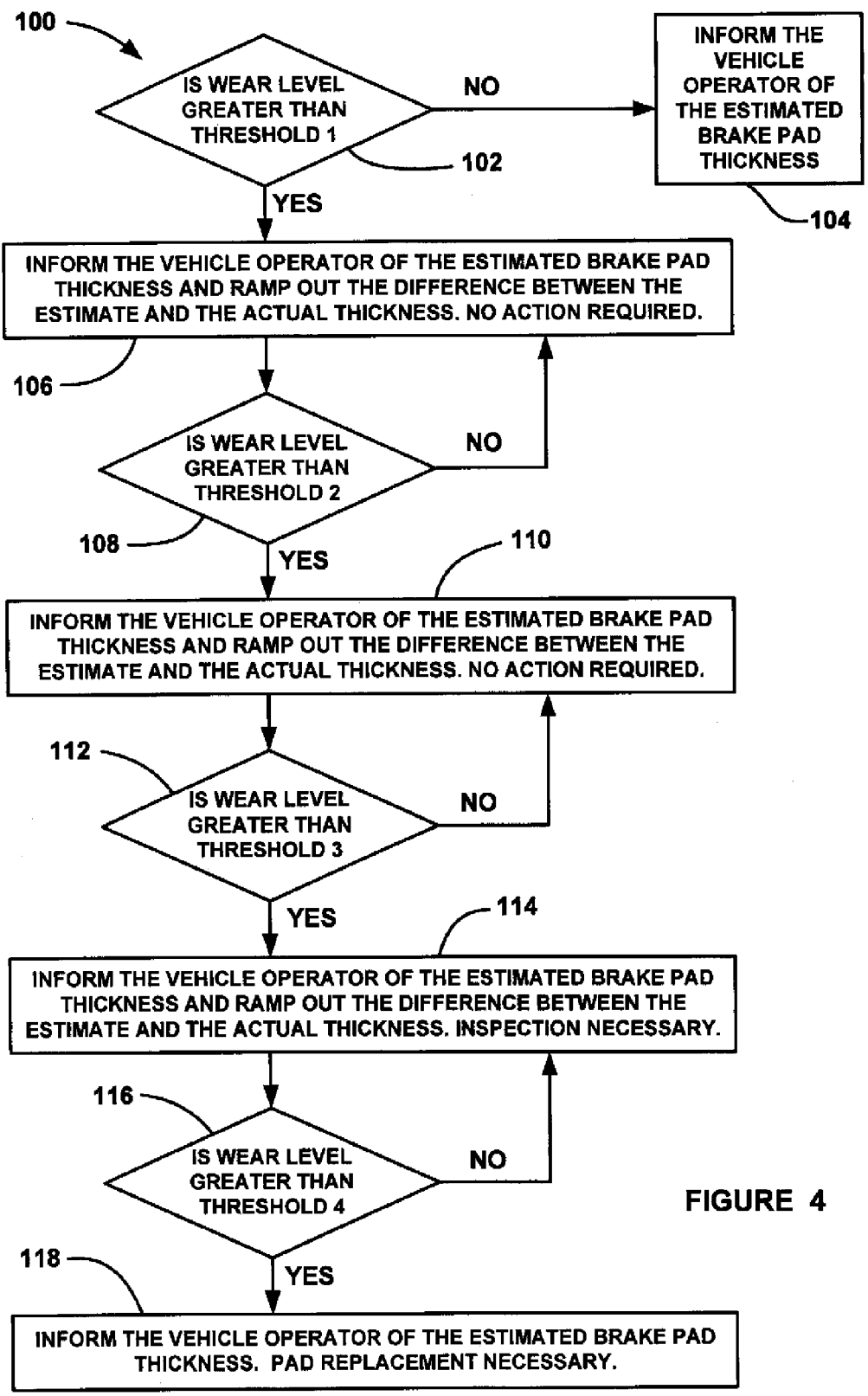
FIG. 4 is a flow chart diagram showing how a vehicle operator may be informed of the brake pad thickness from the brake pad thickness estimation process of the invention.

FIG. 4 is a flow chart diagram 100 showing a process of the invention for notifying the vehicle operator of the estimated brake pad thickness. The algorithm determines whether the wear level of the brake pad is greater than a first predetermine threshold at decision diamond 102 based on the process discussed above. If the brake pad thickness has not reached the first threshold at the decision diamond 102, the algorithm informs the vehicle operator of the current estimated brake pad thickness at box 104. The vehicle operator can be notified in any suitable manner, and can be informed of the miles remaining based on the current wear of the brake pads as to when the brake pads need to be replaced. If the brake pad wear has reached the first threshold at the decision diamond 102, then the algorithm will inform the vehicle operator of the current brake pad thickness at box 106. Further, the algorithm can inform the vehicle operator in miles using a linear interpolation based on vehicle operation to date as to the remaining life of the brake pads, can ramp out differences between the estimated brake pad life, and can indicate to the vehicle operator no action is required at this time. In one non-limiting embodiment, the first threshold will be passed when about 90% of the brake pad has been worn down.

The algorithm then determines whether the brake pad wear has decreased the brake pad thickness to a second predetermined threshold at decision diamond 108, and if not, returns to box 106 to inform the vehicle operator of the current brake pad thickness. If the brake pad wear has reached the second threshold at the decision diamond 108, the algorithm will inform the vehicle operator of the current brake pad thickness at box 110, and perform the same operations as at the box 106.

The algorithm then determines whether the brake pad wear has reached a third predetermined threshold at decision diamond 112, and if not, returns to the box 110 to inform the vehicle operator of the current brake pad thickness. If the brake pad wear has reached the third predetermined threshold at the decision diamond 112, the algorithm will inform the vehicle operator of the current brake pad thickness at box 114, and inform the vehicle operator of the remaining miles before the brake pads need to be replaced. Further, the algorithm may tell the vehicle operator that the brake pads should be inspected.

The algorithm then determines if the brake pad wear level has reached a fourth threshold at decision diamond 116, and if not, returns to the box 114 to inform the vehicle operator of the current brake pad thickness. If the wear level of the brake pad has reached the fourth threshold at the decision diamond 116, the algorithm will inform the vehicle operator of the current brake pad thickness, and provide an indication that the brake pads should be replaced at box 118.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining the thickness of a vehicle brake pad, said method comprising:
   providing vehicle parameters that identify information and/or operating conditions of a vehicle;
   using some of the vehicle parameters to determine the work done by a brake of the vehicle as brake work;
   using the brake work to determine brake pad temperature;
   using the brake pad temperature to determine brake pad wear; and
   accumulating the brake pad wear to provide an estimation of the brake pad thickness.

2. The method according to claim 1 wherein providing vehicle parameters includes providing brake pad friction material, brake pad cooling rate, vehicle mass, road grade, dynamic brake proportioning, vehicle weight distribution, vehicle speed, wheel speed and brake pressure.

3. The method according to claim 2 wherein providing vehicle parameters includes providing vehicle odometer reading, GPS location, map location and ambient temperature.

4. The method according to claim 1 wherein determining the brake work includes subtracting resistance values from total work done by the brake of the vehicle where the resistance values are forces that reduce the total work.

5. The method according to claim 4 wherein determining the brake work includes using the equation:

$$BrakingEnergy = \frac{1}{2}M(V_I^2 - V_F^2) - E_{Rolling\ Resistance} - E_{Grade} - E_{Engine}$$

where BrakingEnergy defines the brake work, M is the mass of the vehicle, $E_{Rolling\ Resistance}$ is the energy required to roll the vehicle on a flat grade, $E_{Grade}$ is the energy required to roll the vehicle based on the grade of the road, $E_{Engine}$ is the braking provided by the vehicle engine, $V_I$ is the velocity of the vehicle at the beginning of a braking event and $V_F$ is the velocity of the vehicle at the end of the braking event.

6. The method according to claim 1 wherein determining the brake work includes determining braking force as brake pressure times brake pad area times brake pad coefficient of friction.

7. The method according to claim 1 wherein determining the brake work includes determining braking power as torque produced by the vehicle times velocity of the vehicle divided by the rolling radius of a vehicle wheel.

8. The method according to claim 1 wherein using the brake work to determine brake pad temperature and using the brake pad temperature to determine brake wear includes using look-up tables.

9. The method according to claim 1 further comprising providing a brake pad sensor that determines the thickness of the brake pad at one or more brake pad thickness levels.

10. The method according to claim 9 further comprising ramping out a difference between the estimated brake pad thickness and the actual brake pad thickness over the remaining thickness of the brake pad.

11. The method according to claim 9 wherein the sensor provides more than one indication of brake pad thickness.

12. The method according to claim 1 further comprising notifying a vehicle operator of the brake pad thickness estimation using telematics.

13. A method for determining the thickness of a vehicle brake pad, said method comprising:
   providing vehicle parameters including brake pad friction material, brake pad cooling rate, vehicle mass, road grade, dynamic brake proportioning, vehicle weight distribution, vehicle speed, wheel speed and brake pressure;
   using the vehicle parameters to determine brake work, wherein the brake work is determined in at least two ways including determining brake work based on braking energy and determining brake work based on braking power;
   using the brake work to determine brake pad temperature;
   using the brake pad temperature to determine brake pad wear;
   accumulating the brake pad wear to provide an estimation of the brake pad thickness;
   providing a brake pad sensor that determines the thickness of the brake pad at one or more brake pad thickness levels; and
   ramping out a difference between the estimated brake pad thickness and the actual brake pad thickness over the remaining thickness of the brake pad.

14. The method according to claim 13 wherein providing vehicle parameters further includes providing vehicle odometer reading, GPS location, map location and ambient temperature.

15. The method according to claim 13 wherein determining the brake work includes subtracting resistance values from total work done by a brake of the vehicle, where the resistance values are forces that reduce the total work.

16. The method according to claim 13 wherein determining the brake work includes determining braking force as brake pressure times brake pad area times brake pad coefficient of friction.

17. The method according to claim 13 wherein determining the brake work includes determining braking power as torque produced by the vehicle times velocity of the vehicle divided by the rolling radius of a vehicle wheel.

18. The method according to claim 13 wherein using the brake work to determine brake pad temperature and using the brake pad temperature to determine brake wear includes using look-up tables.

19. The method according to claim 13 wherein the sensor provides more than one indication of brake pad thickness.

20. The method according to claim 13 further comprising notifying a vehicle operator of the brake pad thickness estimation using telematics.

* * * * *